United States Patent [19]

Maisch

[11] Patent Number: 5,275,476
[45] Date of Patent: Jan. 4, 1994

[54] METHOD FOR SPEEDING UP THE BRAKING INTERVENTION IN THE TRACTION CONTROL MODE, AND HYDRAULIC BRAKE SYSTEM FOR PERFORMING THE METHOD

[75] Inventor: Wolfgang Maisch, Schwieberdingen, Fed. Rep. of Germany

[73] Assignee: Robert Bosch GmbH, Stuttgart, Fed. Rep. of Germany

[21] Appl. No.: 965,316

[22] Filed: Oct. 23, 1992

[30] Foreign Application Priority Data

Oct. 24, 1991 [DE] Fed. Rep. of Germany ....... 4135062

[51] Int. Cl.⁵ .................. B60T 8/32; B60K 28/16
[52] U.S. Cl. ........................ 303/113.2; 303/116.1; 60/453
[58] Field of Search ............... 303/113.2, 113.1, 116.1, 303/119.2, 100, 116.8, 119.1, 10; 364/426.02, 426.03; 60/453

[56] References Cited

U.S. PATENT DOCUMENTS

| | | | |
|---|---|---|---|
| 2,505,213 | 4/1950 | Schnell | 60/453 X |
| 2,962,863 | 12/1960 | Caroli | 60/453 |
| 4,786,118 | 11/1988 | Burgdorf et al. | 303/113.2 |
| 4,952,003 | 8/1990 | Okubo | 303/113.2 |
| 5,015,043 | 5/1991 | Resch | 303/100 |
| 5,131,730 | 7/1992 | Kollers et al. | 303/116.2 X |
| 5,169,214 | 12/1992 | Holzmann et al. | 303/113.2 |
| 5,188,435 | 2/1993 | Willmann | 303/113.2 |
| 5,188,437 | 2/1993 | Willmann | 303/116.2 X |
| 5,205,623 | 4/1993 | Holzmann et al. | 303/113.2 |

FOREIGN PATENT DOCUMENTS

| | | |
|---|---|---|
| 0305950 | 3/1989 | European Pat. Off. . |
| 3629564 | 3/1988 | Fed. Rep. of Germany . |
| 4009640 | 6/1991 | Fed. Rep. of Germany . |
| 9102352 | 8/1992 | Fed. Rep. of Germany . |
| 4107978 | 9/1992 | Fed. Rep. of Germany . |
| 2626230 | 7/1989 | France . |
| 2636575 | 3/1990 | France . |
| 2119883 | 11/1983 | United Kingdom . |
| 2210424 | 6/1989 | United Kingdom ............. 303/113.2 |
| 2239913 | 7/1991 | United Kingdom . |

Primary Examiner—Robert J. Oberleitner
Assistant Examiner—Peter M. Poon
Attorney, Agent, or Firm—Edwin E. Greigg; Ronald E. Greigg

[57] ABSTRACT

A hydraulic brake system for a vehicle having a traction control system, in which at least one self-aspirating pump, pressure fluid can be aspirated through an intake line and a charging valve and can be fed into a brake line leading to at least one wheel brake. A pressure limiting valve that diverts pressure fluid from the brake line to the intake line is also provided. To speed up the braking intervention, the pump is briefly turned on and the charging valve is opened when the vehicle is started, to carry away any gas bubbles that might be located between the charging valve and the pump. This averts the possibility that the compression of gas bubbles that might be present at the onset of traction control could cause the pump to pump less pressure fluid. The method can be employed in hydraulic brake systems of motor vehicles with traction control systems.

6 Claims, 2 Drawing Sheets

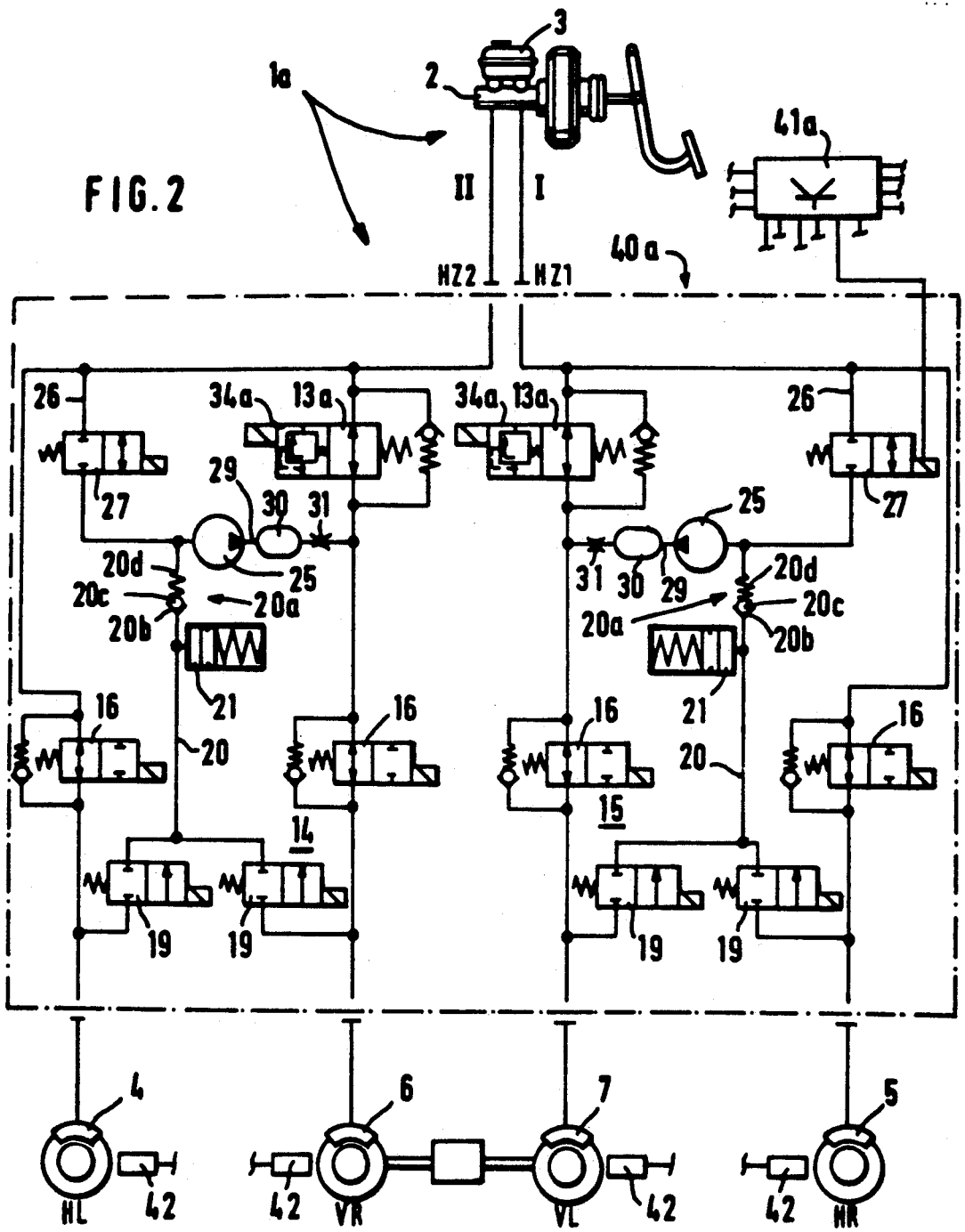

METHOD FOR SPEEDING UP THE BRAKING INTERVENTION IN THE TRACTION CONTROL MODE, AND HYDRAULIC BRAKE SYSTEM FOR PERFORMING THE METHOD

BACKGROUND OF THE INVENTION

The invention is based on a process for speeding up the braking intervention in the traction control mode of a hydraulic brake system for motor vehicles, and a hydraulic brake system for motor vehicles with a traction control system, set forth hereinafter.

Hydraulic brake systems with traction control systems of this kind have already been proposed (German Patent Application P 41 07 978.7; German Utility Model Application G 91 02 352.1), in which the traction control systems have at least one self-aspirating pump for aspirating pressure fluid through an intake line and a charging valve, which is disposed in the intake line and is normally closed, and/or through a negative pressure protection valve assigned to at least one wheel brake and a shutoff valve for furnishing pressures for carrying out the traction control. Since the pressure fluid has high viscosity at low temperatures, braking interventions in the traction control mode can be attained at low temperatures by means of the pumps in the starting phase only disadvantageously slowly. It was therefore proposed that the pressure fluid to be delivered to the pump in these hydraulic brake systems be heated, to reduce the viscosity of the pressure fluid, when the ambient temperatures were below −5° C., for instance. In accordance with one proposal, this is done by repeatedly pumping the pressure fluid through a pressure limiting valve that is operative in the traction control mode, and in accordance with the other proposal by electrically heating the intake line, which leads from a supply tank to the pump. Unavoidable cooling of the traction control system, or a sharp drop in the ambient temperature, causes the pressure confined in these hollow spaces to contract more markedly than the hollow spaces themselves. The result is negative pressures in the pressure fluid, so that the pressure fluid may perhaps shed gas bubbles. Particularly if such gas bubbles coalesce into larger bubbles over the course of several hours, they impede pumping processes, making braking interventions in the traction control mode disadvantageously slow.

OBJECT AND SUMMARY OF THE INVENTION

The method according to the invention, as defined hereinafter, and the hydraulic brake system operating by the method, have the advantage that gas bubbles and/or larger bubbles that may be created in the confined pressure fluid as a result of cooling are flushed away, so that if traction control layer ensues, braking interventions that are desirably fast will come about. Flushing away the gas bubbles and/or larger bubbles can be repeated from time to time, as long as no brake actuation or traction control mode is occurring.

As a result of the provisions recited herein, advantageous developments of and improvements to the method and the brake system including a charging valve are possible. The characteristics of the charging valve and control therefor shorten the times during which the self-aspirating pump can pump, by opening the charging valve, with the advantage that the duration of any interference from annoying pump noise is briefer. The definitive characteristics of delaying opening of the charging valve produce still more shortening of the duration over which the annoying pump noise can arise.

The invention will be better understood and further objects and advantages thereof will become more apparent from the ensuing detailed description of preferred embodiments taken in conjunction with the drawings.

BRIEF DESCRIPTION OF THE DRAWINGS

FIG. 2 shows a second exemplary embodiment with K-type brake circuit distribution, in which the two driven wheels belonging to a driven axle and their wheel brakes are distributed in two different brake circuits.

DESCRIPTION OF THE PREFERRED EMBODIMENTS

Figure 1:
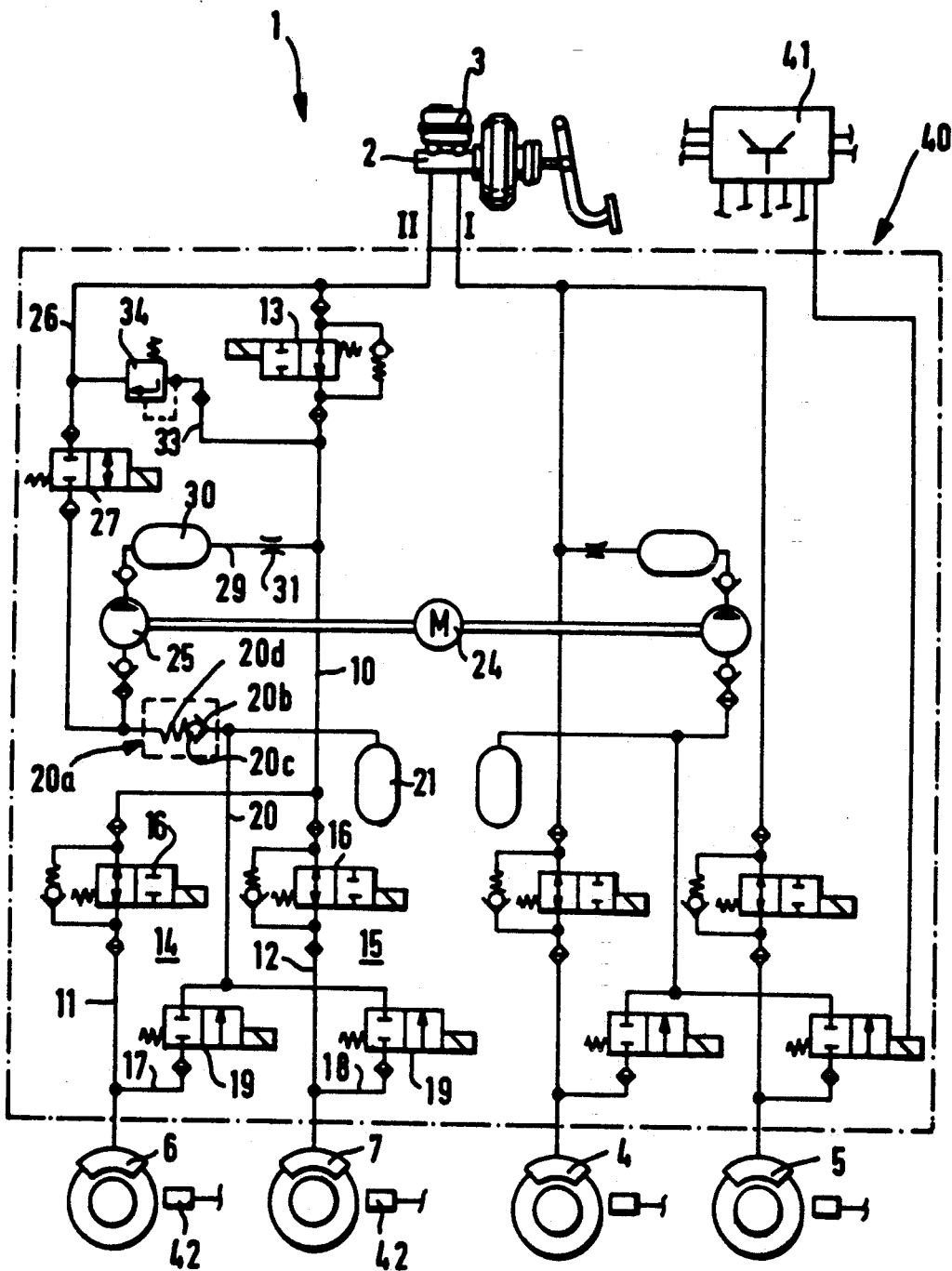
FIG. 1 shows a first exemplary embodiment of the invention with a TT-type brake circuit distribution, that is, one in which the driven wheels belong to one driven axle brake circuit.

The brake system 1 has a pedal-actuatable, dual-circuit master brake cylinder 2 with a pressure fluid supply tank 3. A first brake circuit I of the brake system 1 is connected to wheel brakes 4, 5 of nondriven vehicle wheels, for instance of the front axle of the vehicle. The wheel brakes 6, 7 of driven vehicle wheels, for instance of the rear axle of the vehicle, are connected to a second brake circuit II. The brake circuit II that relates to the provisions of the invention will now be described in detail:

Brake circuit II has a brake line 10 which begins at the master brake cylinder 2 and splits into two brake lines 11 and 12 leading to the wheel brakes 6 and 7, respectively. In the brake line 10, there is a shutoff valve 13 toward the master brake cylinder, having a spring-actuated open position and an electromagnetically switchable shutoff position. Toward the wheel brake, there are pressure control valve assemblies 14, 15 provided for brake pressure modulation. Each valve assembly 14, 15 has one inlet valve 16, disposed in the respective brake line 11, 12 and controlling the inflow of pressure fluid to the wheel brake 6, 7; the inlet valve 16 has one spring-actuated open position and one electromagnetically switchable shutoff position. Between the inlet valve 16 and the wheel brake 6, 7, one return line each 17, 18 begins at the respective brake line 11, 12. One outlet valve 19 is assigned to each of the pressure control valve assemblies 14, 15 in the return lines 17, 18. The outlet valve 19 has one spring-actuated shutoff position and one electromagnetically switchable open position. The return lines 17 and 18 are joined in one return line 20 to which a storage chamber 21 is connected. A negative pressure protection valve 20a is built into the return line 20. It is embodied in the manner of a one-way check valve and has a valve seat 20b, a closing body 20c, and a spring 20d. The negative pressure protection valve 20a can be opened in the direction toward the self-aspirating pump 25 connected to it after a predetermined pressure build-up. The spring 20d is installed with prestressing, so that the negative pressure that the pump can generate is kept away from the wheel brakes 6, 7 when the outlet valves 19 are open.

An electric drive motor 24 drives the pump 25, which generates high pressure. The pump 25, embodied as self-aspirating, communicates by means of an intake line 26 with the brake line 10, specifically between the master brake cylinder 2 and the shutoff valve 13. Located in the intake line 26 is a charging valve 27, having one spring-actuated shutoff position and one electromagnetically switchable open position. On the outlet side, the pump 25 communicates through a feed line 29 with the brake line 10 between the shutoff valve 13 and the connection to the pressure control valve assemblies 14, 15. A damper chamber 30 and a throttle 31 are both disposed in the feed line 29.

An outflow line 33 that leads to the intake line 26 begins at the brake line 10, between the connection of the feed line 29 and the shutoff valve 13. The outflow line 33 is connected to the intake line 26. A pressure limiting valve 34 with a response pressure of 100 bar, for instance, is located in the outflow line 33.

The brake system 1 is accordingly equipped with an anti-lock and traction control system 40. This system has a control unit 41, with which signals from rpm sensors 42 that detect the rotational behavior of the vehicle wheels can be evaluated and can be converted into switching signals for the drive motor 24 of the pump 25 and of the various electromagnetically actuatable valves of the brake system 1. The system 40 is activated whenever there is the danger of locking of at least one vehicle wheel during braking, or whenever at least one of the driven wheels is subjected to impermissibly high slip during startup and acceleration.

When drive slip occurs, the control unit 41 switches the shutoff valve 13 into the shutoff position and switches the charging valve 27 into the open position and turns on the drive motor 24 of the pump 25. The pump 25 aspirates pressure fluid from the supply tank 3 through the intake line 26 and feeds this pressure fluid through the feed line 29 into the brake line 10. By suitable triggering of the inlet valves 16 and outlet valves 19 of the pressure control valve assemblies 14, 15, the brake pressure is modulated in the wheel brake of the driven wheel exhibiting slip.

The control unit 41 is additionally arranged, in a manner essential to the invention, such that on the occasion of starting of a vehicle equipped with it, it briefly turns on the drive motor of the pump 25 and switches the charging valve 27 into the open position at least once, and preferably repeatedly at time intervals. This is optionally suppressed or terminated if a brake actuation has begun, or if traction control is automatically established.

Selectively, the charging valve 27 can be opened as soon and as long as the drive motor 24 is turned on to check its function when the vehicle is started. This results in a transport of the pressure fluid through the pump 25 and accordingly a flushing away of any gas bubbles and/or larger bubbles that might have been created because of negative pressure and that might be located at the inlet to the pump 25. A soon as the charging valve 27 opens, irritating noise may be produced. One might be led as a result to turn off the drive motor 24 even before it reaches its normal rpm. However, that would have the disadvantage that upon turnoff, a disadvantageously high turnoff current could have to be switched by a relay contact or the like, and that the motor function check would be more difficult at low rpm.

It is therefore advantageous to keep the charging valve 27 closed at first and not to turn the drive motor 24 off until it attains its cutoff rpm. When the drive motor 24 is turned off, or after some delay afterward, the charging valve 27 is then opened, so that the pump 25 pumps only during at least part of the time the drive motor 24 is running down, and at the accordingly lower rpm and for the remaining duration until the motor has stopped, it produces less noise. Advantageously, the shutoff valve 13 remains open during this time, so that less pump noise is produced than if pumping were done counter to the opening pressure of the pressure limiting valve 34.

It is fundamentally also possible to flush gas bubbles away with some other brake circuit distribution than the TT-type, also known as front/rear brake circuit distribution, described above. FIG. 2 therefore shows an exemplary embodiment of a brake system 1a with a K-type brake circuit distribution, also known as diagonal brake circuit distribution, in which one drivable front wheel is assigned to each brake circuit I and II, for example. Accordingly, each of the two brake circuits I and II has a self-aspirating pump 25. The pressure control valve assemblies 14, 15 for wheel brakes 6, 7 of drivable wheels are suitably distributed in the respective brake circuits I and II. Each brake circuit here has charging valves 27, negative pressure protection valves 20a and shutoff valves 13a as well as pressure limiting valves 34a. In the example shown, the pressure limiting valves 34a are integrated with the shutoff valves 13s. An exemplary embodiment of such integration is proposed by German Patent Application P 41 02 628.8, U.S. application Ser. No. 789,555 filed Nov. 8, 1991. The control unit 41a is developed further such that it can control the valve 13a and 27 additionally disposed in the brake circuit I. Since the valves of the brake system 1a of the exemplary embodiment of FIG. 2 can fundamentally be triggered in the same way as the valves of the exemplary embodiment of FIG. 1, further description of the control unit 41a is unnecessary.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A method for speeding up a braking intervention in a traction control mode in a hydraulic brake system including brake pressure fluid for motor vehicles having a traction control system and drive wheels, including an electrical control unit which controls electrically controlled valves and a motor which drives a pump, the improvement comprising inserting a normally closed electromagnetic charging intake valve (27) in a brake fluid pressure intake line connected to a main brake line between a master brake cylinder and a shut-off valve in a brake circuit to the driven wheels, and to an inlet to said pump, temporarily starting said motor at least once to drive said pump for a preseleected period of time, and temporarily opening said charging intake valve for a period of time during operation of said pump whereby any bubbles formed in said brake pressure fluid is pumped away.

2. A method as defined by claim 1, in which the charging intake valve (27) is briefly opened whenever said drive motor (24) of the pump (25) is turned off.

3. A method as defined by claim 1, in which the intake valve (27) is opened in delayed fashion after the drive motor (24) of the pump (25) is turned off.

4. An improved braking system for speeding-up a braking intervention in a traction control mode in a hydraulic brake system including brake pressure fluid for motor vehicles having a traction control system and drive wheels, including an electrical control unit which controls electrically controlled valves and a motor which drives a pump, the improvement comprising a normally closed electromagnetic charging intake valve (27) in a brake fluid pressure intake line connected to a main brake line between a master brake cylinder and a shut-off valve in a brake circuit to the driven wheels, and to an inlet to said pump, means for temporarily starting said motor at least once to drive said pump for a preseleected period of time, and means for temporarily opening said charging intake valve for a period of time during operation of said pump whereby any bubbles formed in said brake pressure fluid is pumped away.

5. A hydraulic brake system as defined by claim 4, in which the electrical control unit (41, 41a) is arranged to operate the means for temporarily opening the charging valve (27) from the instant of termination of the power supply to the drive motor (24).

6. A hydraulic brake system as defined by claim 4, in which the electrical control unit (41, 41a) is arranged to operate the means for temporarily opening the charging valve (27) with a time lag after the termination of the power supply to the drive motor (24).

* * * * *